(12) United States Patent
Tamir et al.

(10) Patent No.: US 9,244,881 B2
(45) Date of Patent: *Jan. 26, 2016

(54) FACILITATING, AT LEAST IN PART, BY CIRCUITRY, ACCESSING OF AT LEAST ONE CONTROLLER COMMAND INTERFACE

(71) Applicant: Intel Corporation, Santa Clara, CA (US)

(72) Inventors: Eliezer Tamir, Bait Shemesh (IL); Ben-Zion Friedman, Jerusalem (IL); Theodore L. Willke, Tacoma, WA (US); Eliel Louzoun, Jerusalem (IL); Matthew R. Wilcox, Ottawa (CA); Donald E. Wood, Austin, TX (US); Steven B. McGowan, Portland, OR (US); Robert O. Sharp, Round Rock, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/638,756

(22) Filed: Mar. 4, 2015

(65) Prior Publication Data

US 2015/0234776 A1  Aug. 20, 2015

Related U.S. Application Data

(63) Continuation of application No. 14/162,468, filed on Jan. 23, 2014, now Pat. No. 8,996,755, which is a continuation of application No. 13/077,725, filed on Mar. 31, 2011, now Pat. No. 8,677,031.

(51) Int. Cl.
*G06F 3/00* (2006.01)
*G06F 15/167* (2006.01)
(Continued)

(52) U.S. Cl.
CPC ...... *G06F 15/17331* (2013.01); *H04L 67/1097* (2013.01)

(58) Field of Classification Search
None
See application file for complete search history.

(56) References Cited

U.S. PATENT DOCUMENTS 6,298,407 B1 * 10/2001 Davis et al. ............... 710/314
8,677,031 B2    3/2014 Tamir et al.
(Continued)

FOREIGN PATENT DOCUMENTS

CN        103460202 A    12/2013
DE    11 2012 001 526 T5    1/2014
(Continued)

OTHER PUBLICATIONS

Notice of Allowance received for U.S. Appl. No. 13/077,725, mailed on Oct. 29, 2013, 10 pages.
(Continued)

*Primary Examiner* — Idriss N Alrobaye
*Assistant Examiner* — David E Martinez
(74) *Attorney, Agent, or Firm* — Christopher K. Gagne

(57) ABSTRACT

An embodiment may include circuitry to facilitate, at least in part, a first network interface controller (NIC) in a client to be capable of accessing, via a second NIC in a server that is remote from the client and in a manner that is independent of an operating system environment in the server, at least one command interface of another controller of the server. The command interface may include at least one controller command queue. Such accessing may include writing at least one queue element to the at least one command queue to command the another controller to perform at least one operation associated with the another controller. The another controller may perform the at least one operation in response, at least in part, to the at least one queue element. Many alternatives, variations, and modifications are possible.

24 Claims, 2 Drawing Sheets

(51) Int. Cl.
*G06F 15/173* (2006.01)
*H04L 29/08* (2006.01)

(56) References Cited

U.S. PATENT DOCUMENTS

| | | | | |
|---|---|---|---|---|
| 8,996,755 | B2 | 3/2015 | Tamir et al. | |
| 2001/0002478 | A1* | 5/2001 | Grun | 711/114 |
| 2004/0252709 | A1* | 12/2004 | Fineberg | 370/412 |
| 2007/0035544 | A1* | 2/2007 | Fossum et al. | 345/422 |
| 2007/0112931 | A1* | 5/2007 | Kuik et al. | 709/216 |
| 2009/0172786 | A1* | 7/2009 | Backa | 726/4 |
| 2009/0307341 | A1* | 12/2009 | Minato | 709/223 |
| 2010/0312941 | A1* | 12/2010 | Aloni et al. | 710/310 |
| 2011/0289267 | A1* | 11/2011 | Flynn et al. | 711/103 |
| 2012/0254480 | A1 | 10/2012 | Tamir et al. | |

FOREIGN PATENT DOCUMENTS

| | | |
|---|---|---|
| WO | 2012/135234 A2 | 10/2012 |
| WO | 2012/135234 A3 | 3/2013 |

OTHER PUBLICATIONS

Non Final Office Action received for U.S. Appl. No. 13/077,725, mailed on Apr. 3, 2013, 10 pages.
Final Office Action received for U.S. Appl. No. 13/077,725, mailed on Aug. 20, 2013, 9 pages.
Response to Non-Final Office Action received for U.S. Appl. No. 13/077,725, filed May 24, 2013, 14 pages.
Response to Final Office Action received for U.S. Appl. No. 13/077,725, filed Oct. 11, 2013, 14 pages.
Chadalapaka, et al., "DA: Datamover Architecture for the Inetrnet Small Computer System Interface (iSCSI)", Network Working Group, Request for Comments: 5047, Category: Informational, Oct. 2007, pp. 1-49.
Chadalapaka, et al., "Datamover Architecture for iSCSI (DA)", Internet Draft, draft-ieft-ips-iwarp-da-05.txt, Dec. 11, 2006, pp. 1-65.
Ko, et al., "iSCSI Extensions for RDMA Specification", Internet Draft, draft-ko-iwarp-iser-02.txt, Jul. 15, 2004, pp. 1-80.
International Preliminary Report on Patentability and Written Opinion received for PCT Patent Application No. PCT/US2012/030769, mailed on Oct. 10, 2013, 6 pages.
International Search Report and Written Opinion received for PCT Patent Application No. PCT/US2012/030769, mailed on Oct. 24, 2012, 9 pages.
Recio, et al., "An RDMA Protocol Specification", Internet-Draft, draft-recio-iwarp-rdmap-01.txt, Oct. 21, 2002, pp. 1-57.
Shah, et al., "Direct Data Placement over Reliable Transports" Internet-Draft, draft-shah-iwarp-ddp-OO.txt, Sep. 16, 2002, pp. 1-36.
Office Action received in Chinese patent application No. 201280016334.7, dated Apr. 27, 2015 (10 pages with 8 pages Summary English Translation).
Office Action received in U.S. Appl. No. 14/162,468, dated Aug. 14, 2014 (10 pages).
Notice of Allowance and Examiner Interview Summary received in U.S. Appl. No. 14/162,468, dated Dec. 10, 2014 (8 pages).
"NVM Express," Revision 1.0, Mar. 1, 2011, Intel Corporation (122 pages).
"Non-Volatile Memory Host Controller Interface (NVMHCI) Specification 1.0," Apr. 14, 2008, Intel Corporation (65 pages).

\* cited by examiner

FACILITATING, AT LEAST IN PART, BY CIRCUITRY, ACCESSING OF AT LEAST ONE CONTROLLER COMMAND INTERFACE

FIELD

This disclosure relates to facilitating, at least in part, by circuitry, the accessing of at least one controller command interface.

BACKGROUND

In one conventional computing arrangement, a client and a server include respective network interface controllers (NIC) that are capable of communicating with each other using a Remote Direct Memory Access (RDMA) protocol. The server includes a host processor that executes the server's operating system and associated drivers. The server also includes a storage controller that manages the server's storage. The client's NIC issues requests to the server's NIC to write data to and read data from the storage. The server's operating system, associated drivers, and host processor process the requests received by the server's NIC, and issues corresponding requests to the storage controller. The storage controller receives and executes these corresponding requests. After executing the corresponding requests, the storage controller issues request completion information (and associated data if data has been read from the storage) to the server's operating system and associated drivers. From this, the server's operating system, associated drivers, and host processor generate corresponding request completion information and associated data, and issue the corresponding request completion information and associated data to the server's NIC. The server's NIC then issues the corresponding request completion information and associated data to the client's NIC.

Thus, in the foregoing conventional arrangement, the server's operating system, associated drivers, and host processor process requests received by the server's NIC, and the completion information and data from the storage. This consumes substantial amounts of operating system and host processor processing bandwidth. It also increases the amount of energy consumed and heat dissipated by the host processor. Furthermore, it increases the latency involved in processing the requests issued by the client's NIC.

BRIEF DESCRIPTION OF THE SEVERAL VIEWS OF THE DRAWINGS

Features and advantages of embodiments will become apparent as the following Detailed Description proceeds, and upon reference to the Drawings, wherein like numerals depict like parts, and in which.

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
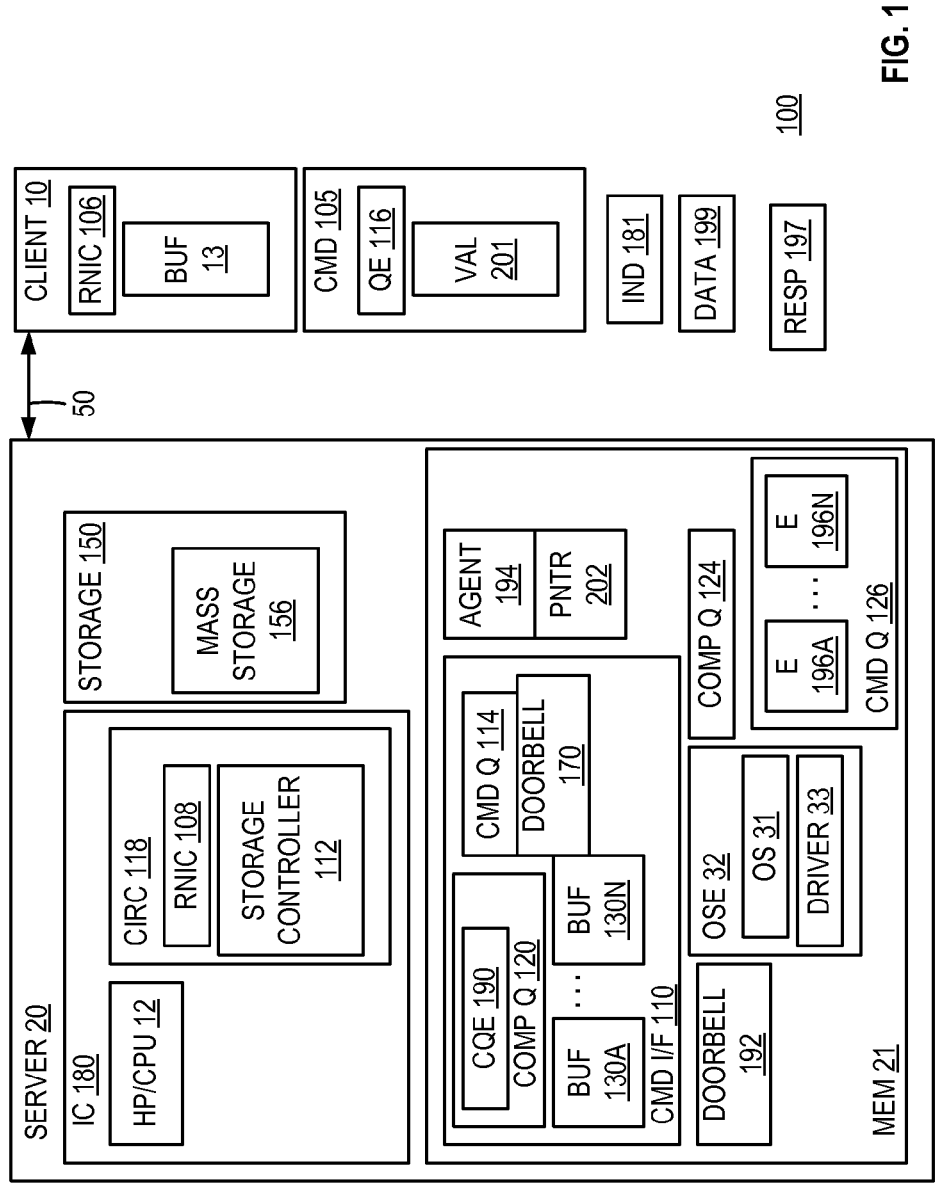
FIG. 1 illustrates a system embodiment.

FIG. 1 illustrates a system embodiment 100. System 100 may include client 10 that is communicatively coupled, via network 50, to server 20. In this embodiment, the terms "host computer," "host," "server," "client," "network node," and "node" may be used interchangeably, and may mean, for example, without limitation, one or more end stations, mobile internet devices, smart phones, media devices, input/output (I/O) devices, tablet computers, appliances, intermediate stations, network interfaces, clients, servers, and/or portions thereof. Although client 10, server 20, and network 50 will be referred to in the singular, it should be understood that each such respective component may comprise a plurality of such respective components without departing from this embodiment. In this embodiment, a "network" may be or comprise any mechanism, instrumentality, modality, and/or portion thereof that permits, facilitates, and/or allows, at least in part, two or more entities to be communicatively coupled together. Also in this embodiment, a first entity may be "communicatively coupled" to a second entity if the first entity is capable of transmitting to and/or receiving from the second entity one or more commands and/or data. In this embodiment, data and information may be used interchangeably, and may be or comprise one or more commands (for example one or more program instructions), and/or one or more such commands may be or comprise data and/or information. Also in this embodiment, an "instruction" may include data and/or one or more commands.

Client 10 may comprise remote direct memory access (RDMA)-enabled network interface controller (RNIC) 10 and/or one or more (and in this embodiment, a plurality of) buffers 13.

Server 20 may comprise one or more integrated circuit (IC) chips 180, memory 21, and/or storage 150. One or more chips 180 may comprise circuitry 118 that may comprise, at least in part, RNIC 108 and/or storage controller 112. Additionally, one or more chips 180 may comprise one or more multi-core host processors (HP) and/or central processing units (CPU) 12. Although not shown in the Figures, server 20 also may comprise one or more chipsets (comprising, e.g., memory, network, and/or input/output controller circuitry). RNIC 108, controller 112, and/or HP/CPU 12 may be capable of communicating with each other. Additionally, RNIC 108, storage controller 112, and/or HP/CPU 12 may be capable of accessing and/or communicating with one or more other components of server 20 (such as, memory 21 and/or storage 150), via one or more such chipsets. In this embodiment, client 10 and/or RNIC 106 may be remote (e.g., geographically remote), at least in part, from server 20 and/or RNIC 108.

In this embodiment, "circuitry" may comprise, for example, singly or in any combination, analog circuitry, digital circuitry, hardwired circuitry, programmable circuitry, co-processor circuitry, state machine circuitry, and/or memory that may comprise program instructions that may be executed by programmable circuitry. Also in this embodiment, a processor, HP, CPU, processor core (PC), core, and controller each may comprise respective circuitry capable of performing, at least in part, one or more arithmetic and/or logical operations, and/or of executing, at least in part, one or more instructions. In this embodiment, an integrated circuit chip may be or comprise one or more microelectronic devices, substrates, and/or dies. Although not shown in the Figures, server 20 may comprise a graphical user interface system that may comprise, e.g., a respective keyboard, pointing device, and display system that may permit a human user to input commands to, and monitor the operation of, server 20 and/or system 100. Also in this embodiment, memory may comprise one or more of the following types of memories: semiconductor firmware memory, programmable memory, non-volatile memory, read only memory, electrically programmable memory, random access memory, flash memory, magnetic disk memory, optical disk memory, and/or other or later-developed computer-readable and/or writable memory.

Storage 150 may comprise mass storage 156. In this embodiment, storage may be or comprise one or more apparatus into, and/or from which, data may be stored and/or retrieved, respectively. Also, in this embodiment, mass storage may be or comprise storage capable of non-volatile storage of data. For example, in this embodiment, mass storage may include, without limitation, one or more non-volatile electro-mechanical, magnetic, optical, and/or semiconductor storage devices.

One or more machine-readable program instructions may be stored, at least in part, in memory 21. In operation of server 20, these machine-readable instructions may be accessed and executed by one or more host processors 12, RNIC 108, and/or controller 112. When executed by one or more HP 12, these one or more machine-readable instructions may result in one or more operating system environments (OSE) 32 being executed at least in part by one or more HP 12, and becoming resident at least in part in memory 21. Also when these machine-readable instructions are executed by RNIC 108 and/or storage controller 112, these one or more instructions may result one or more command interfaces 110 of storage controller 112, one or more doorbells 192, one or more pointers 202, one or more agents 194, one or more queues 124, and/or one or more queues 126 being established and/or executed by RNIC 108 and/or controller 112, and/or becoming resident in memory 21.

In this embodiment, one or more OSE 32 may comprise one or more operating systems (OS) 31 and/or one or more RNIC and/or storage controller drivers 112 drivers 33. One or more drivers 33 may be mutually distinct from one or more OS 31, at least in part. Alternatively or additionally, without departing from this embodiment, one or more respective portions of one or more OS 32 and/or drivers 33 may not be mutually distinct, at least in part, from each other and/or may be comprised, at least in part, in each other. Likewise, without departing from this embodiment, circuitry 118, RNIC 108, and/or controller 112 may be distinct from, or alternatively, may be comprised in the one or more not shown chipsets and/or HP 12. Also without departing from this embodiment, one or more portions of memory 21 may be comprised in RNIC 108, controller 112, circuitry 118, HP 12, and/or IC 180.

In this embodiment, a portion or subset of an entity may comprise all or less than all of the entity. Also, in this embodiment, a process, thread, daemon, program, driver, operating system, application, kernel, and/or virtual machine monitor each may (1) comprise, at least in part, and/or (2) result, at least in part, in and/or from, execution of one or more operations and/or program instructions.

In this embodiment, a command interface may facilitate, permit, and/or implement, at least in part, exchange, transmission, and/or receipt of data and/or one or more commands. Also in this embodiment, a queue, buffer, and/or doorbell may comprise one or more locations (e.g., specified and/or indicated, at least in part, by one or more addresses) in memory in which data and/or one or more commands may be stored, at least temporarily. Furthermore, in this embodiment, a queue element may be or comprise data and/or one or more commands to be stored and/or stored in one or more queues, such as, for example, one or more descriptors and/or one or more commands. Additionally, in this embodiment, a pointer may indicate, address, and/or specify, at least in part, one or more locations and/or one or more items in memory.

In this embodiment, RNIC 106 and RNIC 108 may exchange data and/or commands via network 50 in accordance with one or more protocols that may comply and/or be compatible with an RDMA (e.g., iWARP) protocol, Ethernet protocol, and/or Transmission Control Protocol/Internet Protocol (TCP/IP) protocol. For example, the RDMA protocol may comply and/or be compatible with Recio et al., "An RDMA Protocol Specification," Internet Draft Specification, Internet Engineering Task Force (IETF), 21 Oct. 2002. Also for example, the Ethernet protocol may comply and/or be compatible with Institute of Electrical and Electronics Engineers, Inc. (IEEE) Std. 802.3-2008, Dec. 26, 2008. Additionally, for example, the TCP/IP protocol may comply and/or be compatible with the protocols described in Internet Engineering Task Force (IETF) Request For Comments (RFC) 791 and 793, published September 1981. Many different, additional, and/or other protocols may be used for such data and/or command exchange without departing from this embodiment (e.g., earlier and/or later-developed versions of the aforesaid, related, and/or other protocols).

In this embodiment, circuitry 118 may permit and/or facilitate, at least in part, RNIC 106 to capable of accessing, via RNIC 108, one or more command interfaces 110. For example, circuitry 118 may permit and/or facilitate, at least in part, RNIC 106 being able to so access one or more command interfaces 110 in a manner that is independent of OSE 32 in server 20. This accessing may include, for example, the writing of at least one queue element (e.g., one or more queue elements (QE) 116) to one or more command queues 114 in one or more interfaces 114. This may command the storage controller 112 to perform, at least in part, one or more operations involving storage 150 and/or mass storage 156 associated with controller 112. The controller 112 may perform these one or more operations in response, at least in part, to the one or more queue elements 116 (e.g., after and in response, at least in part, to the one or more elements 116 being written into one or more queues 114). These one or more operations involving storage 150 and/or mass storage 156 may comprise one or more write operations and/or one or more read operations involving, at least in part, storage 150 and/or mass storage 156. In this embodiment, an access may comprise one or more read operations and/or one or more write operations, such as, in this example, involving storage 150 and/or mass storage 156.

By way of example, in operation of system 100, client 10 and/or RNIC 106 may authenticate client 10 and/or RNIC 106 to server 20 and/or RNIC 108. This may result in client 10 and/or RNIC 106 being granted permission to access, at least in part, server 20 (e.g., via RNIC 108). Contemporaneously, after, or prior to this, at least in part, RNIC 108, controller 112, one or more agents 194, and/or OSE 32 may generate, establish, and/or maintain, at least in part, in memory 21, one or more interfaces 110 and/or one or more indicators 181 that may indicate, at least in part, where (e.g., one or more locations) in memory 21 one or more interfaces 110 and/or the components thereof may be located. For example, one or more indicators 181 may indicate, at least in part, one or more locations in memory 21 where one or more command queues 114, one or more completion queues 120, one or more doorbells 170, and/or one or more buffers 130A . . . 130N may be located. RNIC 108 may provide, via network 50, one or more indicators 181 to RNIC 106. Thereafter, RNIC 106 may use one or more of the one or more indicators 181 to access one or more interfaces 110 and/or one or more components of the one or more interfaces 110. One or more indicators 181 may be or comprise, at least in part, one or more handles for one or more regions in memory 21, such as, in this embodiment, one or more Stags that comply and/or are compatible with RDMA (e.g., iWARP) protocol.

After receiving one or more indicators 181, client 10 and/or RNIC 106 may issue one or more commands 105 to server 20, via network 50 and RNIC 108, to storage controller 112 in a manner that by-passes and/or is independent of the involvement of OSE 32. The one or more commands 105 may command storage controller 112 to perform one or more operations involving storage 150 and/or mass storage 156.

For example, one or more commands 105 may comply and/or be compatible with RDMA (e.g., iWARP) protocol. One or more commands 105 comprise and/or specify, at least in part, one or more queue elements 116 that may embody and/or indicate, at least in part, the one or more operations involving storage 150 and/or mass storage 156 that are being commanded. Although not shown in the Figures, one or more commands 105 may comprise, specify, and/or indicate, at least in part, one or more of the indictors 181 that may indicate one or more locations in one or more command queues 114 as one or more intended destinations of one or more queue elements 116.

In this example, one or more queue elements 116 may command that controller 112 perform one or more write operations involving storage 150 and/or mass storage 156. Therefore, one or more commands 105 also may include and/or specify, at least in part, data 199 to be written, as a result of executing one or more queue elements 116, by controller 112 to storage 150 and/or mass storage 156. One or more commands 105 may comprise, specify, and/or indicate, at least in part, one or more of the indicators 181 that may indicate one or more locations of one or more buffers (e.g., buffer 130A) to which data 199 is to be written (at least temporarily).

In response, at least in part, to receipt of one or more commands 105, RNIC 108 may directly write (e.g., in accordance with RDMA (e.g., iWARP) protocol and/or in a manner that by-passes and/or is independent of OSE 32), in the manner commanded by one or more commands 105, one or more queue elements 116 and data 199 to one or more command queues 114 and one or more buffers 130A, respectively. Thus, in effect, by issuing one or more commands 105 to RNIC 108, RNIC 106 may write one or more queue elements 116 and data 199 to one or more command queues 114 and one or more buffers 130A, respectively.

One or more commands 105 also may comprise and/or specify one or more values 201 and one or more of the indicators 181 that may indicate one or more locations of one or more doorbells 170 to which one or more values 201 are to be written. In response, at least in part, to these one or more values 201 and these one or more of the indicators 181 in one or more commands 105, RNIC 108 may directly write (e.g., in accordance with RDMA (e.g., iWARP) protocol and/or in a manner that by-passes and/or is independent of OSE 32), in the manner commanded by one or more commands 105, one or more values 201 in doorbell 170. The writing of one or more values 201 in doorbell 170 may ring doorbell 170. Thus, in effect, by issuing one or more commands 105 to RNIC 108, RNIC 106 may ring doorbell 170.

In this embodiment, the ringing of a doorbell that is associated with an entity may comprise and/or involve, at least in part, the writing one or more values to one or more memory locations (e.g., associated with, comprising, and/or embodying the doorbell) that may result in and/or trigger, at least in part, the entity performing, at least in part, one or more operations and/or actions. In addition or alternatively, although not shown in the Figures, without departing from this embodiment, one or more doorbells 170 may be comprised, at least in part, in circuitry 118 and/or controller 112. Also additionally or alternatively, without departing from this embodiment, one or more doorbells 192 may be comprised, at least in part, in circuitry 118 and/or controller 108. In these additional or alternative arrangements, the doorbells 170 and/or 192 may appear to CPU 12 and/or server 20 as one or more respective memory locations (not shown) in respective memory (not shown) in controller 112 and/or controller 108, respectively.

In response, at least in part, to the ringing of doorbell 170, controller 112 may return to a fully operational state (e.g., if controller 112 had previously entered a reduced power state relative to this fully operational state), and may read one or more queue elements 116 that were written into one or more queues 114. Controller 112 then may execute, at least in part, the one or more commands that are specified and/or embodied by one or more queue elements 116. This may result in controller 112 performing, at least in part, the one or more operations (e.g., one or more writes to storage 150 and/or mass storage 156 of data 199 stored in one or more buffers 130A) involving storage 150 and/or mass storage 156.

After completion, at least in part, of these one or more operations involving storage 150 and/or mass storage 156, controller 112 may generate and write, at least in part, one or more completion queue elements (CQE) 190 to one or more completion queues 120. Also after completion, at least in part, of these one or more operations involving storage 150 and/or mass storage 156, controller 112 also may write, at least in part, one or more values to one or more doorbells 192 associated with RNIC 108. This may ring one or more doorbells 192. In response, at least in part, to the ringing of one or more doorbells 192, RNIC 108 may write (e.g., via on or more RDMA write operations and/or RNIC 106) one or more completion queue elements 190 to one or more buffers 13 in client 10 (e.g., via one or more responses 197).

After one or more (e.g., several) such write and/or read operations involving storage 150 and/or mass storage 156 have been performed, at least in part, one or more agents 194 may carry out certain management functions. For example, one or more agents 194 may establish, at least in part, one or more command queue entries/elements (E) 196A ... 196N in one or more command queues 126 associated with RNIC 108 and/or one or more command queue entries/elements QE A ... QE N in table 250 (see FIG. 2). As is discussed below, these elements 196A ... 196N and/or QE A ... QE N, when executed, at least in part, by RNIC 108, may permit and/or facilitate copying, at least in part, of one or more other queue entries (e.g., one or more storage controller completion entries 190) to client 10 and/or RNIC 106 and/or data read by storage controller 112.

These management functions also may comprise the updating (e.g., appropriately advancing), at least in part, by one or more agents 194 of one or more pointers (e.g., ring pointers PNTR 202) associated with one or more queue pairs (e.g., command/completion queue pair 114, 120 and/or command/completion queue pair 126, 124) associated with the storage controller 112 and RNIC 108, respectively. This may permit new entries to the queue pairs to be stored at locations that will not result in erroneous overwriting of other entries in the queue pairs. Additionally, as part of these management functions, the one or more agents 194 may indicate one or more of the buffers 130A ... 130N that may be available to be reused.

As another example, one or more queue elements 116 may command that controller 112 perform one or more read operations involving storage 150 and/or mass storage 156. Therefore, one or more commands 105 also may include and/or specify, at least in part, one or more locations in storage 150 and/or mass storage 156 from which controller 112 is to read data 199, as a result of executing one or more queue elements 116.

In response, at least in part, to receipt of one or more commands 105, RNIC 108 may directly write (e.g., in accordance with RDMA (e.g., iWARP) protocol and/or in a manner that by-passes and/or is independent of OSE 32), in the manner commanded by one or more commands 105, one or more queue elements 116 to one or more command queues 114. Thus, in effect, by issuing one or more commands 105 to RNIC 108, RNIC 106 may write one or more queue elements 116 to one or more command queues 114 and one or more buffers 130A, respectively.

In this example, one or more commands 105 also may comprise and/or specify one or more values 201 and one or more of the indicators 181 that may indicate one or more locations of one or more doorbells 170 to which one or more values 201 are to be written. In response, at least in part, to these one or more values 201 and these one or more of the indicators 181 in one or more commands 105, RNIC 108 may directly write (e.g., in accordance with RDMA (e.g., iWARP) protocol and/or in a manner that by-passes and/or is independent of OSE 32), in the manner commanded by one or more commands 105, one or more values 201 in doorbell 170. The writing of one or more values 201 in doorbell 170 may ring doorbell 170. Thus, in effect, by issuing one or more commands 105 to RNIC 108, RNIC 106 may ring doorbell 170.

In response, at least in part, to the ringing of doorbell 170, controller 112 may return to a fully operational state (e.g., if controller 112 had previously entered a reduced power state relative to this fully operational state), and may read one or more queue elements 116 that were written into one or more queues 114. Controller 112 then may execute, at least in part, the one or more commands that are specified and/or embodied by one or more queue elements 116. This may result in controller 112 performing, at least in part, the one or more operations (e.g., one or more reads of storage 150 and/or mass storage 156 to obtain data 199) involving storage 150 and/or mass storage 156 and storing data 199 in one or more buffers (e.g., one or more buffers 130A).

After completion, at least in part, of these one or more operations involving storage 150 and/or mass storage 156, controller 112 may generate and write, at least in part, one or more completion queue elements 190 to one or more completion queues 120. Also after completion, at least in part, of these one or more operations involving storage 150 and/or mass storage 156, controller 112 also may write, at least in part, one or more values to one or more doorbells 192 associated with RNIC 108. This may ring one or more doorbells 192. In response, at least in part, to the ringing of one or more doorbells 192, RNIC 108 may write (e.g., via on or more RDMA write operations and/or RNIC 106) one or more completion queue elements 190 and the data 199 to one or more buffers 13 in client 10 (e.g., via one or more responses 197).

In this embodiment, command interface 110 may be asynchronous in that, for example, completion queue elements may not be stored in an order in one or more completion queues 120 that corresponds to (1) the order in which command queue elements are stored in the one or more command queues 114, (2) the order in which such command queue elements are executed and/or completed by the storage controller 112, and/or (3) the order in which completion queue elements are stored in one or more completion queues 120 and/or provided to RNIC 106 and/or client 10. In operation, RNIC 106 and/or client 10 may appropriately reorder, in the case of write commands issued from the client 10 and/or RNIC 106, corresponding completion queue elements received from RNIC 108. However, in the case of read commands, in this embodiment, in order to permit respective data read from storage 150 and/or mass storage 156 to be appropriately associated with corresponding completion queue elements for transmission to client 10 and/or RNIC 106, each completion queue element (e.g., element 190) issued by storage controller 112 may include the elements illustrated in FIG. 2.

Figure 2:
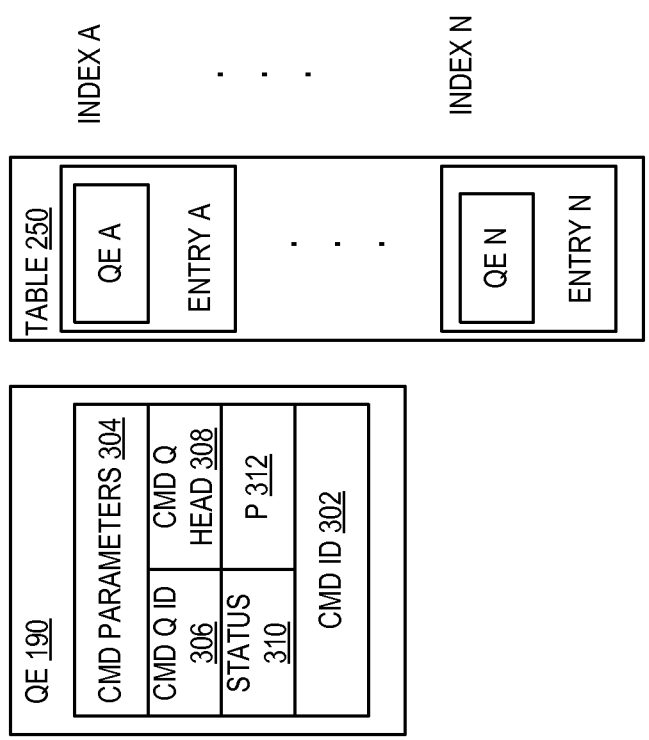
FIG. 2 illustrates features in an embodiment.

As shown in FIG. 2, completion queue element (e.g., element 190) may include one or more command parameters 304, one or more command queue identifiers 306, one or more command queue head position indicators 308, status information 310, one or more queue phase bit (P) 312, and/or one or more command identifiers 302. One or more parameters 304 may be and/or indicate one or more command specific parameters of the one or more command queue elements 116 and/or commands 105 that may correspond to and/or be associated with the one or more completion queue elements 190. One or more command queue identifiers 306 may indicate and/or specify the one or more command queues 114 to which the one or more command queue elements 116 were written. One or more command queue head position indicators 308 may indicate the current position (e.g., in the one or more command queues 114 identified by one or more identifiers 306) at which the one or more command queue elements 116 may be located. Status information 310 may indicate whether the one or more commands 105 and/or one or more command queue elements 116 were successfully performed by the storage controller 112. One or more phase bits 312 may indicate whether the one or more elements 190 constitute the most recently added valid entry (e.g., to service) in one or more completion queues 120. One or more command identifiers 302 may indicate, at least in part, and/or be identical to one or more corresponding command identifiers in the corresponding one or more command queue elements 116. This latter field 302 may permit one or more completion queue elements 190 to be correctly associated with one or more corresponding command queue elements 116 and/or with the respective data 199 read from the storage 150 and/or mass storage 156 as a result of the execution of these one or more corresponding command queue elements 116.

For example, in this embodiment, one or more identifiers 302 may be selected so as not to collide with and/or be identical to any other command identifiers that may be currently used by any completion queue elements that have not yet been provided to client 10 and/or RNIC 106 by RNIC 108. The command identifiers that may be used in system 100 may be pre-calculated and/or pre-generated, and may be used as respective indices INDEX A . . . INDEX N for respective entries ENTRY A . . . ENTRY N in a table 250 that may be stored, at least in part, in memory 21. Each of the entries ENTRY A . . . ENTRY N in the table 250 may store one or more respective pre-calculated and/or pre-generated command queue elements QE A . . . QE N that may be associated with RNIC 108. Each respective element QE A . . . QE N may be associated with one or more respective buffers in one or more buffers 130A . . . 130N. Each of the buffers in one or more buffers 130A . . . 130N into which controller 112 may store data read from storage 150 and/or mass storage 156 also may be associated with one or more respective command identifiers used in system 100 and/or respective entries ENTRY A . . . ENTRY N.

The command queue elements QE A . . . QE N may be stored and/or maintained in table 250 by client 10 and/or one or more agents 194. If one or more buffers 130A . . . 130N are statically allocated, table 250 may be static, and may correspond in terms of, for example, allocation characteristics to one or more buffers 13 that may be allocated in the client 10.

By way of example, after controller 112 reads data 199 from storage 150 and/or mass storage 156, controller 112 may store the data 199 in one or more buffers (e.g., one or more buffers 130A) that may be associated with one or more command identifiers 302, and may store one or more completion queue elements 190 in one or more completion queues 120. In response, at least in part, to controller 112 ringing one or more doorbells 192, RNIC 108 may determine, based at least in part upon one or more bits 312, the one or more most recently added valid completion queue elements 190 in one or more queues 120. RNIC 108 may use the one or more command identifiers 302 in one or more elements 190 to index into table 250 to locate the one or more entries (e.g., one or more entries ENTRY A) and one or more command queue elements (e.g., one or more queue elements QE A) in table 250 that may be associated with and/or identified, at least in part, by one or more command identifiers 302. RNIC 108 may execute, at least in part, one or more commands that may be associated with and/or embodied by these one or more command queue elements QE A. This may result, at least in part, in RNIC 108 reading one or more buffers 130A to obtain data 199, and transmitting data 199 and one or more completion queue elements 190 to RNIC 106 and/or client 10 (e.g., via one or more responses 197). As a result, data 199 and/or one or more completion queue elements 190 may be copied into one or more client buffers 13.

Alternatively, in this embodiment, RNIC 108 may comprise, at least in part, a state machine (not shown). This state machine may be independent and/or separate from, at least in part, of one or more command queues 126 that may be associated with and/or utilized by RNIC 108. This state machine may locate one or more command queue elements QE A in table 250 based at least in part upon one or more command identifiers 302, and may copy the one or more command queue elements QE A into one or more corresponding command queue elements 196A in one or more queues 126. The state machine then may signal RNIC 108 to access and execute, at least in part, one or more elements 196A in one or more queues 126.

Further alternatively, without departing from this embodiment, prior to completing one or more read operations involving storage 150 and/or mass storage 156, controller 112 may locate and/or select, at least in part, one or more command queue elements QE A in and/or from table 250, based at least in part upon one or more command identifiers 302. Controller 112 then may write into one or more completion queue elements 190 into one or more completion queues 120, and may write one or more elements QE A into one or more corresponding elements 196A in one or more command queues 126. Controller 112 then may ring one or more doorbells 192. This may result in RNIC 108 accessing and executing, at least in part, one or more elements 196A in one or more queues 126. This may result, at least in part, in RNIC 108 reading one or more buffers 130A to obtain data 199, and transmitting data 199 and one or more completion queue elements 190 to RNIC 106 and/or client 10 (e.g., via one or more responses 197). As a result, data 199 and/or one or more completion queue elements 190 may be copied into one or more client buffers 13.

In this alternative, firmware and/or one or more agents 194 executed, at least in part, by controller 112 may maintain per-queue-pair context information to indicate one or more queue pairs used for RDMA transactions. This context information also may include various pointers (e.g., to one or more arrays of elements 196A ... 196N to move data from one or more buffers 130A ... 130N to one or more buffers 13, and/or the head of one or more queues 126, one or more queues 126), one or more locations of one or more doorbells 192 and one or more values to ring the one or more doorbells 192, and/or local copies of head and/or pointers to the one or more queues 126. Various of these pointers (e.g., the head and tail pointers) may be dynamically updated by firmware executed by the controller 112.

Additionally or alternatively, without departing from this embodiment, RNIC 108 and/or storage controller 112 may be comprised, at least in part, in the not shown chipset or in a not shown circuit board. Also additionally or alternatively, without departing from this embodiment, storage 150 and/or mass storage 156 may be comprised, at least in part, internally in server 20 or be external to server 20.

Further although the foregoing description has been made with reference to controller 108 being an RNIC, and controller 112 being a storage controller, the principles of this embodiment may be applied to circumstances in which protocols other than and/or in addition to RDMA may be employed, and/or in which controller 112 may be involved in executing and/or facilitating operations that do not involve storage 150 (e.g., other and/or additional input/output and/or communication-related operations). Accordingly, without departing from this embodiment, controller 108 may utilize, and/or communications between client 10 and server 20 may employ, protocols other than and/or in addition to RDMA. Also, without departing from this embodiment, controller 112 may be involved in executing and/or may facilitate execution of such other and/or additional operations. In these additional and/or alternative arrangements, hardware and/or firmware circuitry (not shown) may be comprised in circuitry 118 that may permit, at least in part, writing to doorbells 170 and/or 192 via, e.g., one or more interrupt mechanisms (e.g., one or more message signaled interrupts (MSI/MSI-X) and/or other mechanisms). This embodiment should be viewed broadly as covering all such modifications, variations, and alternatives.

Thus, an embodiment may include circuitry to facilitate, at least in part, a first NIC in a client to be capable of accessing, via a second NIC in a server that is remote from the client and in a manner that is independent of an operating system environment in the server, at least one command interface of another (e.g., storage, and/or another/additional type of) controller of the server. The NIC in the client and the NIC in the server may be or comprise respective remote direct memory access-enabled network interface controllers (e.g., controllers capable, at least in part, of utilizing and/or communicating via RDMA). The command interface may include at least one (e.g., storage, and/or other/additional type of) controller command queue. Such accessing may include writing at least one queue element to the at least one command queue to command the another controller to perform at least one operation (e.g., involving storage, and/or involving one or more other and/or additional types of operations, such as, other and/or additional input/output operations) associated with the another controller. The another controller may perform the at least one operation in response, at least in part, to the at least one queue element. Many alternatives, variations, and modifications are possible.

Thus, in this embodiment, the one or more command interfaces 110 of storage controller 112 in server 20 may be directly accessed by the client's RNIC 106 via one or more RDMA transactions, in a manner that by-passes, is independent of, and/or does not involve the server's OSE 32 and/or CPU 12. Advantageously, this may permit storage commands, data, and completion messages to be communicated between the client and server much more quickly and efficiently, and with reduced latency. Furthermore, in this embodiment, interactions between RNIC 108 and controller 112 may be carried out entirely or almost entirely by hardware (e.g., utilizing peer-to-peer memory and doorbell writes), and also in a manner that by-passes, is independent of, and/or does not involve the server's OSE 32 and/or CPU 12. Advantageously, this may permit such interactions to be carried out much more quickly and efficiently, and with reduce latency. Additionally, the above features of this embodiment may reduce the server's power consumption, heat dissipation, and the amount of bandwidth consumed by the OSE 32 and CPU 12.

Many other modifications are possible. For example, as stated previously, in this embodiment, client 10 may comprise a plurality of clients. If RDMA is employed for communications between server 20 and the clients 10, in this embodiment, advantageously, the clients 10 may dynamically share buffers 130A . . . 130N, as a common pool of buffers, between or among the client 10 in carrying out their communications with server 20, RNIC 108, and/or controller 112. In order to permit such buffer sharing, RNIC 108 may be capable of manipulating, adjusting, and/or modifying, at least in part, buffer-specifying information that may be indicated, at least in part, in commands 105 provided to the server 20 by the clients 10 in order to allow the buffers 130A . . . 130N and/or other server resources to be shared among the clients 10 without resulting in, for example, contention-related issues.

For example, the one or more indicators 181 and/or Stags indicated by the one or more indicators 181 may include respective information that RNIC 108 may associate with one or more buffers and/or buffer pools in the buffers 130A . . . 130N, instead of and/or in addition to one or more memory region handles. In this arrangement, the clients 10 may perform RDMA read operations utilizing such indicators 181, and RNIC 108 may perform write operations to the one or more buffers and/or buffer pools indicated by the respective information and/or indicators 181. In carrying out its operations, RNIC 108 may appropriately adjust the actual commands and/or command queue elements provided to the controller 112 in order to result in the correct buffers, etc. being written to by controller 112 when controller 112 carries out such commands and/or command queue elements.

Alternatively or additionally, without departing from this embodiment, RNIC 108 may comprise and/or be associated with a shared receive queue (not shown) to receive, for example, commands 105 from multiple clients 10. RNIC 108 may be capable of substituting, at least in part, one or more appropriate server buffer addresses, values, and/or other information into one or more portions (e.g., queue elements 116, values 201, indicators 181, and/or other information) of the received commands 105 to permit sharing of the structures in the one or more command interfaces 110 between or among multiple clients 10, without resulting in contention or other degradation in performance. In this arrangement, the clients may not be provided and/or utilize one or more Stags to the storage controller's command queue and/or doorbell, and writing to these structures may be performed by the server's RNIC 108. Advantageously, this may permit multiple clients 10 that may be associated with and/or utilize the shared receive queue to utilize and/or share, at least in part, the same storage controller command queue, doorbell, and/or other structures.

For example, in the case of a write operation, one or more indicators 181, one or more values 201, and/or other information in one or more commands 105 may indicate, at least in part, one or more storage controller Stags for the write operation (and related information), and/or one or more RDMA Stags to one or more buffers to which one or more completion queue elements may be written. Based at least in part upon the one or more received commands 105 and/or other information stored in RNIC 108, RNIC 108 may select one or more buffers in buffers 130A . . . 130N and one or more locations in the command queue 114 to which to post the data 199 to be written and one or more corresponding command queue elements to controller 112, respectively. RNIC 108 may post the data 199 and the one or more corresponding command queue elements in accordance with such selections, and thereafter, may ring doorbell 170. As posted by RNIC 108, the one or more command queue elements may indicate the one or more storage controller Stags supplied in the one or more commands 105, command identifier 302, security context information (e.g., to permit validation of the one or more storage controller Stags), and/or one or more Stags to the one or more buffers to which data 199 has been posted. After the controller 112 has completed, at least in part, the requested one or more write operations and posted one or more completion queue elements, controller 112 may ring doorbell 192. Based at least in part upon information in table 250, RNIC 108 may generate and forward to the one or more clients that provided the received command 105 one or more appropriate responses 197.

In the case of a read operation, generally analogous information may be provided in command 105 and generally analogous operations may be performed by RNIC 108 and/or controller 112. However, in the case of a read operation, the data 199 read by the controller 112 may be stored by the controller 112 to one or more of the buffers 130A . . . 130N specified by the RNIC 108, and may be read by the RNIC 108, instead of vice versa (e.g., as may be the case in a write operation). The RNIC 108 may transmit the read data 199 to the one or more clients that provided the received command 105 in one or more responses 197. In the foregoing arrangement, command 105 may be similar or identical to a command that may be utilized by a client to access storage local to the client, at least from the vantage point of one or more client-executed applications initiating such access. Advantageously, this may permit remote operations and/or RDMA transactions of the types previously described to be substantially transparent to these one or more client-executed applications.

Thus, in this embodiment, advantageously, it may be possible for multiple clients to share the storage controller's command queue, doorbells, and/or the server's buffers, and/or to write to these structures (via the server's RNIC) using RDMA protocol, without suffering from resource contention issues (and/or other disadvantages) that might otherwise occur. The server's RNIC may be capable of modifying, at least in part, information associated with and/or comprised in the clients' commands 105 to facilitate such sharing and/or sharing of RDMA Stag information between or among the clients. Advantageously, this may permit RDMA protocol to be employed for command communication and/or completion between the server and multiple clients, with improved scalability, while reducing the memory consumption to implement such features, and without degradation in communication line rate.

Many other and/or additional modifications, variations, and/or alternatives are possible without departing from this embodiment. Accordingly, this embodiment should be viewed broadly as encompassing all such alternatives, modifications, and variations.

What is claimed is:

1. An apparatus comprising:
circuitry to facilitate, at least in part, in operation, a first network interface controller (NIC) in a first node to be capable of accessing, via a second NIC in a second node that is remote from the first node and in a manner that is independent of an operating system environment, at least one queue associated with a mass storage controller of the second node, the accessing including writing at least one queue element to the at least one queue to command the mass storage controller to perform at least one operation associated with the mass storage controller, the mass storage controller to perform the at least one operation in response, at least in part, to the at least one queue element, the at least one queue being in memory of the second node, the second NIC being capable, at least in part, of providing at least one indicator to the first NIC to indicate, at least in part, where the at least one queue is located, and the first NIC being capable of using the at least one indicator to access, at least in part, the at least one queue.

2. The apparatus of claim 1, wherein:
in response, at least in part, to the writing of the at least one queue element, the second NIC is to write the at least one queue element to at least one other queue in the memory, the at least one other queue being associated with the mass storage controller.

3. The apparatus of claim 1, wherein:
the mass storage comprises at least one non-volatile semiconductor mass storage device.

4. The apparatus of claim 1, wherein:
the circuitry is comprised, at least in part, in the first node, and comprises, at least in part, the first NIC.

5. The apparatus of claim 1, wherein:
the circuitry is comprised, at least in part, in the second node, and comprises, at least in part, the second NIC and the mass storage controller.

6. The apparatus of claim 1, wherein:
the at least one operation comprises at least one of a write operation and a read operation; and
an integrated circuit chip comprises the second NIC and the mass storage controller.

7. The apparatus of claim 1, wherein:
the at least one queue is to receive queue elements from multiple network interface controllers of multiple nodes.

8. The apparatus of claim 1, wherein:
the first NIC and the second NIC are capable of communicating with each other in accordance with, at least in part, remote direct memory access protocol.

9. A method comprising:
facilitating, at least in part, by circuitry, a first network interface controller (NIC) in a first node to be capable of accessing, via a second NIC in a second node that is remote from the first node and in a manner that is independent of an operating system environment, at least one queue associated with a mass storage controller of the second node, the accessing including writing at least one queue element to the at least one queue to command the mass storage controller to perform at least one operation associated with the mass storage controller, the mass storage controller to perform the at least one operation in response, at least in part, to the at least one queue element, the at least one queue being in memory of the second node, the second NIC being capable, at least in part, of providing at least one indicator to the first NIC to indicate, at least in part, where the at least one queue is located, and the first NIC being capable of using the at least one indicator to access, at least in part, the at least one queue.

10. The method of claim 9, wherein:
in response, at least in part, to the writing of the at least one queue element, the second NIC is to write the at least one queue element to at least one other queue in the memory, the at least one other queue being associated with the mass storage controller.

11. The method of claim 9, wherein:
the mass storage comprises at least one non-volatile semiconductor mass storage device.

12. The method of claim 9, wherein:
the circuitry is comprised, at least in part, in the first node, and comprises, at least in part, the first NIC.

13. The method of claim 9, wherein:
the circuitry is comprised, at least in part, in the second node, and comprises, at least in part, the second NIC and the mass storage controller.

14. The method of claim 9, wherein:
the at least one operation comprises at least one of a write operation and a read operation; and
an integrated circuit chip comprises the second NIC and the mass storage controller.

15. The method of claim 9, wherein:
the at least one queue is to receive queue elements from multiple network interface controllers of multiple nodes.

16. The method of claim 9, wherein:
the first NIC and the second NIC are capable of communicating with each other in accordance with, at least in part, remote direct memory access protocol.

17. Non-transitory computer-readable memory storing one or more instructions that when executed by a machine result in performance of operations comprising:
facilitating, at least in part, by circuitry, a first network interface controller (NIC) in a first node to be capable of accessing, via a second NIC in a second node that is remote from the first node and in a manner that is independent of an operating system environment, at least one queue associated with a mass storage controller of the second node, the accessing including writing at least one queue element to the at least one queue to command the mass storage controller to perform at least one operation associated with the mass storage controller, the mass storage controller to perform the at least one operation in response, at least in part, to the at least one queue element, the at least one queue being in second node memory comprised in the second node, the second NIC being capable, at least in part, of providing at least one indicator to the first NIC to indicate, at least in part, where the at least one queue is located, and the first NIC being capable of using the at least one indicator to access, at least in part, the at least one queue.

18. The non-transitory computer-readable memory of claim 17, wherein:
in response, at least in part, to the writing of the at least one queue element, the second NIC is to write the at least one queue element to at least one other queue in the second node memory, the at least one other queue being associated with the mass storage controller.

19. The non-transitory computer-readable memory of claim 17, wherein:
the mass storage comprises at least one non-volatile semiconductor mass storage device.

20. The non-transitory computer-readable memory of claim 17, wherein:
the circuitry is comprised, at least in part, in the first node, and comprises, at least in part, the first NIC.

21. The non-transitory computer-readable memory of claim 17, wherein:
the circuitry is comprised, at least in part, in the second node, and comprises, at least in part, the second NIC and the mass storage controller.

22. The non-transitory computer-readable memory of claim 17, wherein:
the at least one operation comprises at least one of a write operation and a read operation; and
an integrated circuit chip comprises the second NIC and the mass storage controller.

23. The non-transitory computer-readable memory of claim 17, wherein:
the at least one queue is to receive queue elements from multiple network interface controllers of multiple nodes.

24. The non-transitory computer-readable memory of claim 17, wherein:
the first NIC and the second NIC are capable of communicating with each other in accordance with, at least in part, remote direct memory access protocol.

* * * * *